Aug. 20, 1935.  T. C. BELK  2,011,996
FOOD CARRYING TRAY
Filed Feb. 27, 1934   3 Sheets-Sheet 1

Inventor

T. C. Belk

By Clarence A O'Brien
Attorney

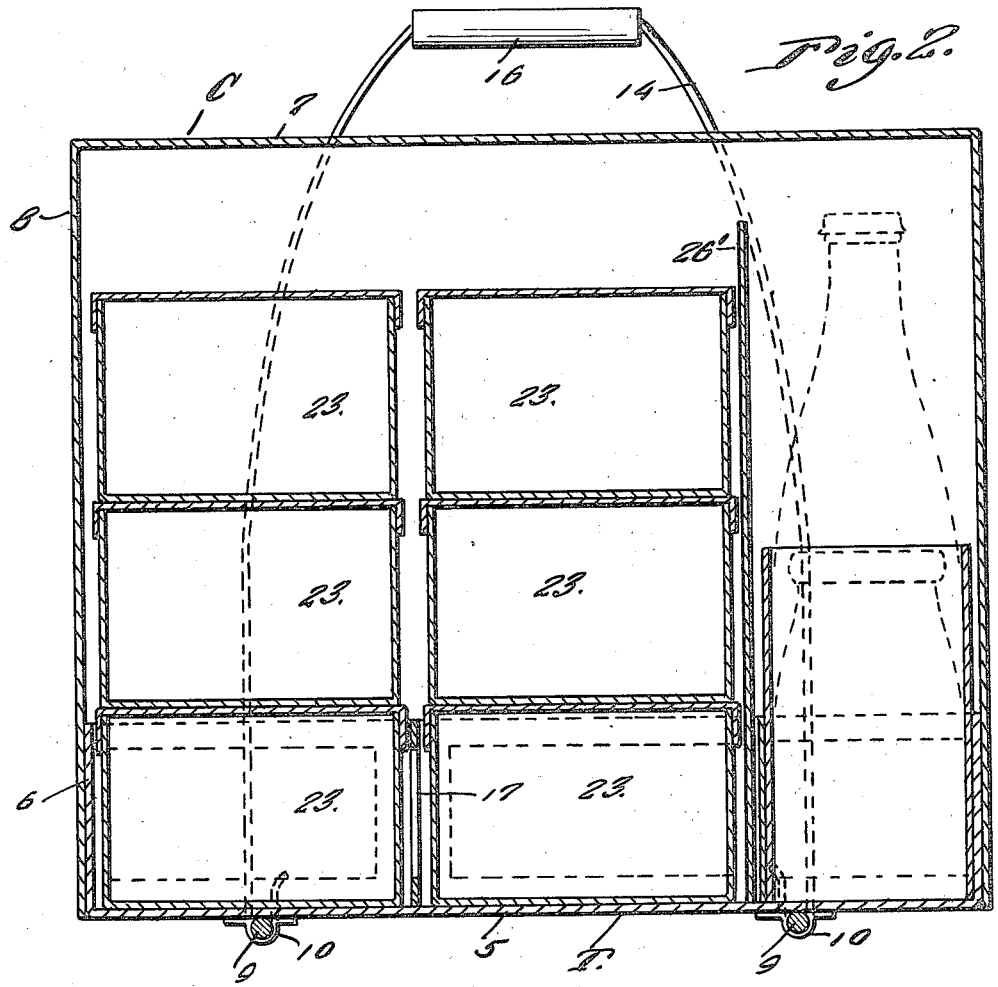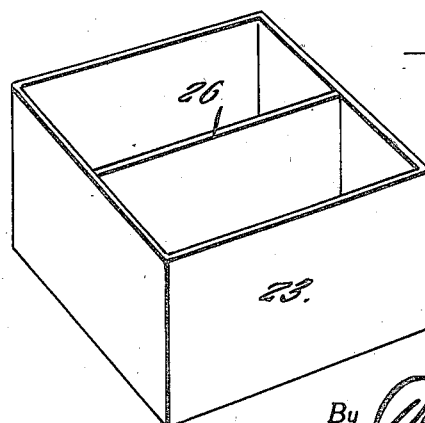

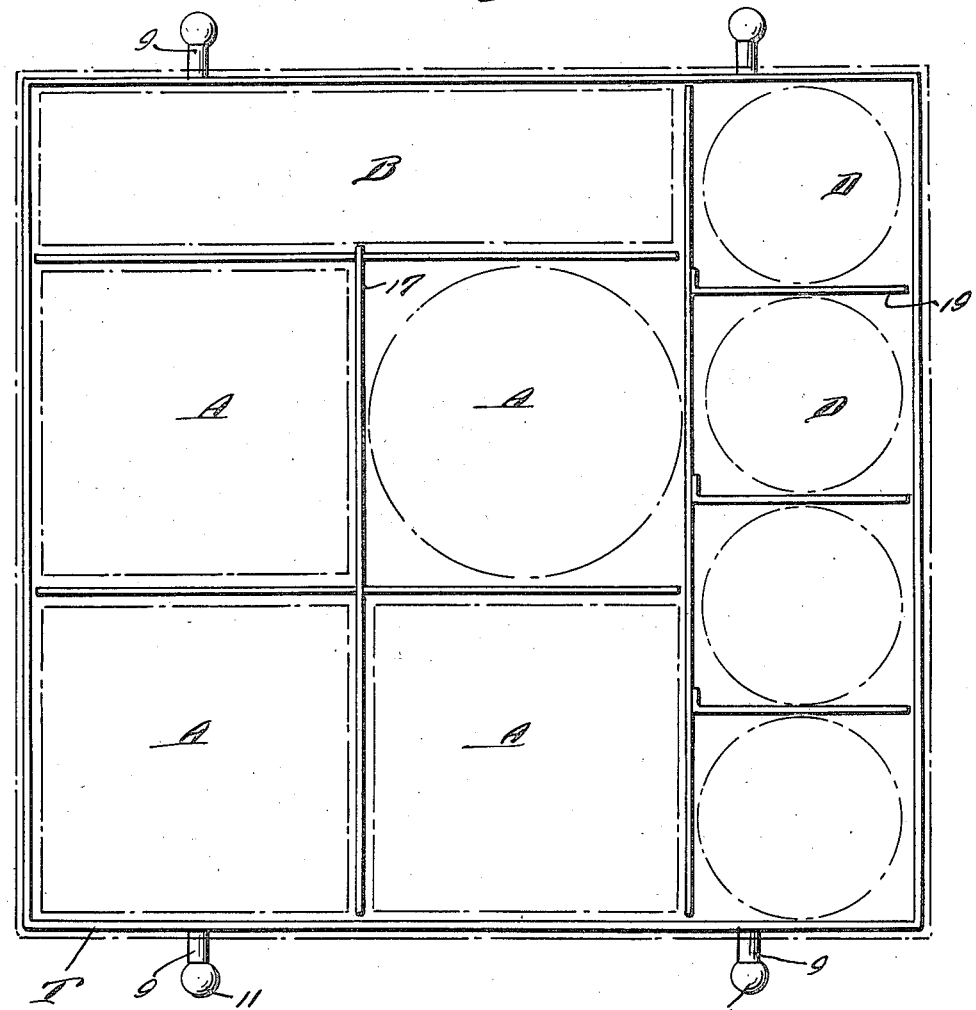
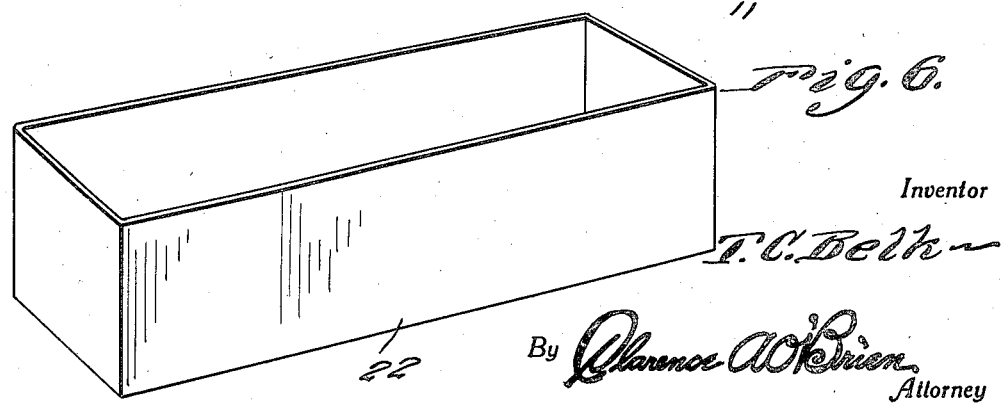

Patented Aug. 20, 1935

2,011,996

UNITED STATES PATENT OFFICE 2,011,996

FOOD CARRYING TRAY

Trannie C. Belk, Camden, S. C.

Application February 27, 1934, Serial No. 713,215

2 Claims. (Cl. 220—1)

The present invention relates to a tray designed for the use of sending meals from hospital kitchens to patients, or from wholesale kitchens to rooms, also from lunch counters, tea rooms or other eating places to private parties or special dinners.

The object of the invention resides in the provision of a carrier tray of this nature which is simple in its construction, compact and convenient in its arrangement of parts, inexpensive to manufacture, easy to carry, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will hereinafter be more fully described and claimed.

In the drawings:

Figure 2 is a vertical sectional view therethrough.

Figure 3 is a top plan view of the tray with the cover removed.

Figure 5 is a perspective view of one of the containers with the cover removed.

Figure 6 is a perspective view of another of the containers with the cover removed.

Figure 1:
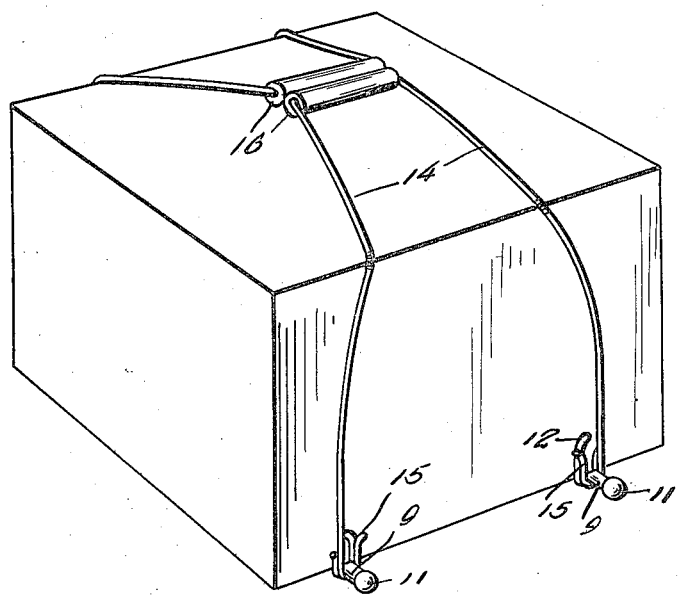
Figure 1 is a perspective view of a tray embodying the features of my invention.

Referring to the drawings in detail it will be seen that the letter T denotes generally the tray and the letter C denotes generally the cover. The tray has a square bottom 5 with side walls 6 rising therefrom. The cover C has a top 7 with side walls 8 depending therefrom. The top 7 is square and of a slightly larger area than the bottom 5 so that the side walls 8 may telescope over the side walls 6. The side walls 8 are about four times the size and height of the walls 6. A pair of spaced parallel coextensive rods 9 are fixed under the bottom 5 by suitable means 10 and project outward beyond the sides thereof terminating in knobs 11 as clearly illustrated in Figures 1 and 3. The bottom edges of two of the walls 8 rest on these rods when the cover is in closed position. The cover has swinging hooks 12 to engage over the projecting ends of the rod as illustrated to advantage in Figure 1. A pair of bails 14 have hook ends 15 to engage over the ends of the rod 9 and the two handles 16 on the bails are adapted to abut as shown in Figure 1 so that the tray may be easily and conveniently carried from place to place.

Figure 4:
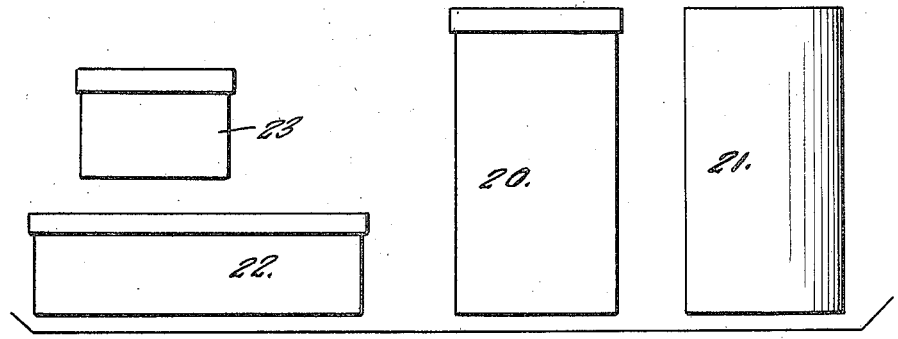
Figure 4 is a group elevation of the containers to be used in the tray.
Figure 7:
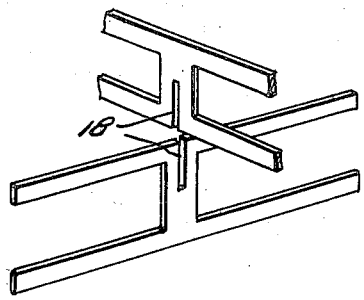
Figure 7 is a perspective view showing fragmentary portions of partitions before assembly.

The tray is divided up into a plurality of compartments. This is accomplished by means of removable partitions 17 arranged as shown in Figure 3 by way of example. These partitions cross each other having slots 18 so that they may interfit having their upper and lower edges flush with one another. In the example of the use of partitions in Figure 3 it will be seen that I provide four square compartments denoted by the letters A, a relatively elongated compartment B and a still longer compartment which is subdivided by removable partitions 19 into a plurality of relatively small square compartments D. In these compartments D may be placed bottles or round containers 20 and 21 as shown in Figure 4. Container 22 is adapted to be placed in compartment B while a plurality of the containers 23 are placed in the compartment A although in one compartment a large thermos bottle may be carried as indicated in the large circular dotted line configuration of Figure 3. These containers 23 may be partitioned as desired as indicated at 26. It will be noted that the containers are piled one above the other as shown in Figure 2 so that in each compartment A and the compartment B there may be three containers or more depending upon the height of the cover. To prevent the pile of containers from falling over on to the bottles or the like in compartments D a wall 26' may be fastened to the partition between compartments D and compartments A and B as shown to advantage in Figure 2. It will be understood that the arrangement has been given merely as an example and numerous other arrangements may be used without departing from the spirit or scope of this invention as hereinafter claimed.

Having thus described my invention, what I claim as new is:

1. In combination, a tray, a cover having side walls telescoping over the side walls of the tray, rods fixed across the bottom of the tray and projecting beyond the sides thereof so that the cover may rest thereon, and a pair of bails having hook ends engageable with the ends of the rods, and swinging hooks mounted on the cover to engage over the ends of the rods.

2. In combination, a tray, a cover having side walls telescoping over the side walls of the tray, rods fixed across the bottom of the tray and projecting beyond the sides thereof so that the cover may rest thereon, a pair of bails having hook ends engageable with the ends of the rods, and hooks pivoted to the cover and adapted to engage the projecting ends of the rods to detachably fasten the cover to the tray.

TRANNIE C. BELK.